(12) United States Patent
Zhang

(10) Patent No.: US 10,106,652 B2
(45) Date of Patent: Oct. 23, 2018

(54) LOW-TEMPERATURE SYNTHESIS OF POLYARYLETHERKETONE RESIN ONTO NANO/MICRON-SCALE INORGANIC SEEDBED

(71) Applicant: ZHANGJIAGANG XIANGCHENG MEDICAL MATERIAL SCIENCE AND TECHNOLOGY CO., LTD., Zhangjiagang (CN)

(72) Inventor: Xiangcheng Zhang, Stoke-on-Trent (GB)

(73) Assignee: ZHANGJIAGANG XIANGCHENG MEDICAL MATERIAL SCIENCE AND TECHNOLOGY CO., LTD., Zhangjiagang (CN)

( * ) Notice: Subject to any disclaimer, the term of this patent is extended or adjusted under 35 U.S.C. 154(b) by 0 days.

(21) Appl. No.: 15/100,541

(22) PCT Filed: Nov. 20, 2014

(86) PCT No.: PCT/CN2014/091791
§ 371 (c)(1),
(2) Date: May 31, 2016

(87) PCT Pub. No.: WO2015/078330
PCT Pub. Date: Jun. 4, 2015

(65) Prior Publication Data
US 2016/0297929 A1 Oct. 13, 2016

(30) Foreign Application Priority Data
Nov. 28, 2013 (CN) .......................... 2013 1 0613616

(51) Int. Cl.
| | | |
|---|---|---|
| C01B 33/12 | (2006.01) | |
| C08G 65/40 | (2006.01) | |
| C08L 71/00 | (2006.01) | |
| C08L 71/10 | (2006.01) | |
| C01F 7/02 | (2006.01) | |
| C08J 5/00 | (2006.01) | |
| C08K 3/22 | (2006.01) | |
| C08K 3/30 | (2006.01) | |
| C08K 3/36 | (2006.01) | |
| C08K 3/013 | (2018.01) | |
| C08K 3/32 | (2006.01) | |

(52) U.S. Cl.
CPC .......... *C08G 65/4093* (2013.01); *C01B 33/12* (2013.01); *C01F 7/021* (2013.01); *C08G 65/4012* (2013.01); *C08J 5/005* (2013.01); *C08K 3/013* (2018.01); *C08K 3/22* (2013.01); *C08K 3/30* (2013.01); *C08K 3/36* (2013.01); *C08L 71/00* (2013.01); *C08L 71/10* (2013.01); *C08G 2650/40* (2013.01); *C08J 2371/12* (2013.01); *C08K 2003/2227* (2013.01); *C08K 2003/325* (2013.01)

(58) Field of Classification Search
CPC ..... C01B 33/12; C01F 7/021; C08G 65/4012; C08G 65/4093; C08G 2650/40; C08J 5/005; C08J 2371/12; C08K 3/0033; C08K 3/22; C08K 3/30; C08K 3/36; C08K 2003/2227; C08K 2003/325; C08L 71/00; C08L 71/10
See application file for complete search history.

(56) References Cited

U.S. PATENT DOCUMENTS

| | | | | | |
|---|---|---|---|---|---|
| 3,956,240 | A | * | 5/1976 | Dahl | C08G 61/127 528/125 |
| 4,361,693 | A | * | 11/1982 | Jansons | C08G 61/127 528/125 |
| 4,645,819 | A | * | 2/1987 | Sterzel | E21D 11/34 528/125 |

FOREIGN PATENT DOCUMENTS

CN 103665368 A 3/2014

OTHER PUBLICATIONS

Rui Ma et al., "Structure and mechanical performance of in situ synthesized hydroxyapatite/polyetheretherketone nanocomposite materials," Journal of Sol-Gel Schience and Technology, Apr. 2012.*
The World Intellectual Property Organization (WIPO) International Search Report for PCT/CN2014/091791 dated Mar. 4, 2015.

* cited by examiner

Primary Examiner — Irina S Zemel
(74) Attorney, Agent, or Firm — Anova Law Group, PLLC

(57) ABSTRACT

Disclosed is a low-temperature preparation method for a polyaryletherketone inorganic composite material, in particular a method for the low-temperature synthesis of a polyaryletherketone resin on a nano/micron-scale inorganic seedbed. The method comprises: adding nano/micron-scale inorganic material particles (mono-element or multi-element of aluminium oxide, silicon oxide, hydroxyapatite and the like) to a reaction system of a polyaryletherketone high-molecular polymer, and realizing the blending of inorganics in a high proportion (>50%) and organics while completing the one-step polymerization reaction, so that the common thermal degradation problem of the organic materials induced during the melting, blending and thermal processing is avoided. The composite material can be used in the technical fields of aerospace, industry, medicine and the like.

9 Claims, 1 Drawing Sheet

LOW-TEMPERATURE SYNTHESIS OF POLYARYLETHERKETONE RESIN ONTO NANO/MICRON-SCALE INORGANIC SEEDBED

TECHNICAL FIELD

The present invention relates to a low-temperature synthetic method for manufacturing polyaryletherketone inorganic composites, in particular a method for the low-temperature synthesis of a polyaryletherketone resin on a nano/micron-scale inorganic seedbed. The composites naturally formed by this method have very good mechanical properties for intended applications in a range of industries including engineering, aerospace, defence, medicine.

BACKGROUND

Polyaryletherketone (PEAK) is a polymer family that consist of a series of phenylene groups connected by ether and carbonyl groups (ketone) bonds. In accordance with different connection orders and proportions of ether bonds, ketone groups and benzene groups in a molecular chain, the polyaryletherketone can form many different polymers, mainly including five categories: poly etherketone, poly etheretherketone, poly etheretherketoneketone, polyetherketoneketone and polyetherketoneetherketoneketone. As a family of thermoplastic heat-resistant polymers, the polyaryletherketone has a higher glass transition temperature and melting point, long term application temperature can be as high as 250° C. while short term operating temperature can reach 300° C. This kind of polymer is hardly decomposed at 400° C. for a short period of time. Due to the excellent mechanical performance, chemical corrosion resistance, radiation resistance, flame resistance, abrasion resistance, impact resistance etc,. the PEAK polymers have being seen increasingly to replace metal as engineering materials for a range of industry including aerospace and nuclear industry. Another unique property of PAEK is its good biocompatibility. It is also resistant to bioreaction, so a good biomaterial for medical device applications.

By forming a PAEK composite, the performance of the polymer composite is further improved, which is inevitably extended it to a wider range of applications as an engineering material. Inorganic filler in the composite has enhanced thermal properties and anti-wearing and biocompatibility properties comparing to the virgin PAEK. So it is seen more development work on forming PAEK composites. The composite technology used to improve the PAEK include adding rigid fillers, fibre and or in combination with copolymerization. Reports and patents about PAEK composites of ten use such technology by adding reinforcing materials into the PAEK matrix, which include glass fiber, carbon fiber, carbon powder, carbon nanotube, graphene, silicon carbide, silicon nitride, aluminium oxide, calcium carbonate, silicon dioxide, zeolite. The forming technology mainly employed is thermal processing to mechanically mixing PAEK with a reinforcement material to form a composite product, such as using compression molding technology. For example, in the patent "Abrasion-Resistant Polyaryletherketone Composite and development methods " (application Number CN201310210216.5), it disclose a technology that used carbon fiber, lubricant, nano graphite powder plus other ingredients to be mechanically mixed with PAEK at a high temperature of about 350° C. Another example is the patent "Composite, Electronic Device processing and forming technology" (Application Number CN201180038632.1), It has used the same mmethod through mechanical mixing of an inorganic material with PAEK. However, one of the fundamental flaw employing the physical mixing method is that it creates at least two problems: (1) nonuniform dispersion of inorganic nano/micron particles in the polymer matrix; and (2) thermal degradation of organic materials is inevitable during high temperature melting, mechanical blending and thermal processing so that leads to weakening the mechanical properties of the virgin PAEK polymer.

SUMMARY

To solve the above problems, the purpose of the present invention is to provide a method for the low-temperature synthesis of a PAEK onto a nano/micron-scale inorganic seedbed to form a uniform composite during the polymerization with no need for mechanical mixing after completion of the polymerization. The synthesis method comprises: adding nano/micron-scale inorganic particles (mono-element or multi-elements of aluminium oxide, silicon oxide, hydroxyapatite and the like) into a PAEK polymerization system , the composite are formed and uniformly during polymerization, which blends/mixes inorganic particles with the forming polymer "naturally". This technology can achieve high inorganic loading, say well above 50% in one-step polymerization. Therefore, this new technology has eliminated such problem as nono-uniform mixing and thermal degradation that always occur in normally blending/mixing processing to form a polymer composite.

To achieve above purpose, the present invention provides a synthesis method at low-temperature that leads to PAEK directly synthesized onto each individual nano/micron-scale inorganic particles, so the a uniform PAEK composite can be formed "naturally" during polymerization.

In the present invention, the synthesis example may comprise the following specific steps:

Firstly add nano/micron-scale inorganic particles (ceramics, glass and/or calcium phosphate), $Al_2O_3$ and dichloroethane into a 500 mL three-necked flask reactor equipped with a mechanical stirrer, a thermometer and a nitrogen delivery tube to introduce high-purity nitrogen in the reactor for 1 to 2 hours. It follows by cooling the reactor to a low temperature between −5° C. to −20° C. and then starting stirring, and making sure all dissolvable solids are completely dissolved at this temperature. After that, gently dropping three reaction reagents one by one in the order firstly N-methyl pyrrolidone, then dichloroethane, and last diphenyl ether and paraphthaloyl chloride (and/or terephthaloyl chloride) into the three-necked flask reactor. Keep reaction at low temperature between −5° C. and −15° C. for 1 to 2 hours, then raise the temperature of the reaction system to a temperature between 15° C. and 26° C. and keep the reaction for 10 to 15 hours. After that add diphenyl ether to the three-necked flask reactor to further reaction for 1 to 5 hours (preferably 3 hours). Finally, add methanol to the three-necked flask reactor to precipitate a white solid; and wash the white solid by using distilled water, methanol and distilled water in turn, and drying the final product at 80° C. to 120° C. for 10 to 20 hours. The end product is the composite of polyetherketoneketone (PEKK) that has been naturally coated onto each inorganic particles during polynmerization, hence the present invention. The yield of PEKK was greater than 90%.

According to the embodiments of the present invention, preferably, in the above synthesis method, the nano/micron-scale inorganic material particle has a diameter of less than 50 μm. The diameter is preferably 20 nm to 50 μm.

According to the embodiments of the present invention, preferably, in the above synthesis method, the nano/micron-scale inorganic particles are inorganic materials including at the least ceramics, or calcium phosphates and glasses According to the embodiments of the present invention, preferably, in the above synthesis method, the polyaryletherketone comprises at least one of the following: polyetherketone, polyetheretherketone, polyetherketoneketone, polyetheretherketoneketone, and polyetherketoneetherketoneketone.

According to the embodiments of the present invention, preferably, in the above synthesis method, the ceramics comprise at least one of the following compositions: $Al_2O_3$, BeO, $ZrO_2$, MgO, $TiO_2$, BC, SiC and WC.

According to the embodiments of the present invention, preferably, in the above synthesis method, the glasses comprise at least one of the following compositions: $SiO_2$, $Na_2O$, $K_2O$, CaO, MgO, BaO, PdO, ZnO, $B_2O_3$ and $P_2O_5$.

According to the embodiments of the present invention, preferably, in the above synthesis method, the calcium phosphates comprise at least one of the following compositions: $Ca(H_2PO_4)_2$, $Ca_3(PO_4)_2$, $Ca_3(PO_4)_2$, $Ca_5(PO_4)_3(OH)$, $Ca_5(PO_4)_3(OH)$, $Ca_{10}(PO_4)_6(OH, F, Cl$ or $Br)_2$, $Ca_8H_2(PO_4)_6 \cdot 5H_2O$.

According to the embodiments of the present invention, preferably, in the above synthesis method, the polyaryletherketone molecules that are synthesized through a polymerization onto the surface of each individual inorganic particle by firstly adding nano/micron-scale inorganic particles into a reaction system where the monomers of a polyaryletherketone form polyaryletherketone molecules through low temperature polymerization of the monomers onto each individual inorganic particle that forms a composite unit, whereby collection of all the composite units are the nano/micron-scale inorganic polyaryletherketone composites.

According to the embodiments of the present invention, preferably, in the above synthesis method, the content of an inorganic material is formulated between 0 and 100 wt % of the total weight of the composites of the claim 8.

According to the embodiments of the present invention, preferably, in the above synthesis method, the low temperature of polymerization of polyaryletherketone is controlled at 0° C. to −20° C.

In the synthesis method of the present invention, a polymerization reaction is conducted at a low temperature, say lower than 0° C. The polymerization mechanism is an electrophilic substitution to form the polymer while each of nano/micron-scale inorganic particles acts as a carrier. The unique advantage of this innovation is that ratio of inorganic nano/particles to monomers of the polymer can be changed easily according the product requirements. For example, using $Al_2O_3$ particles as PEKK polymerization seedbed (refer to SEM photograph shown in FIG. 1a), PEKK molecules grow on the surface of each $Al_2O_3$ particles, so we obtained very uniform PEKK inorganic composite because each $Al_2O_3$ particle is an individual composite, which is shown in FIG. 1b. The synthesis method of the present invention is particularly suitable for manufacturing very high inorganic loading composites of PEKK, for example, inorganic weight percentage has been achieved ranging from 50% up to 90%. The synthesis method "naturally" forms uniform composite because each particle acts as individual composite unit. Therefore, we have solved problems associated with classical technology using physical and mechanical mixing that leads low inorganic loading and non-uniform composites. It also leads to the polymer degradation due to that PAEK has very high melting point so mixing temperature must be above its melting temperature when it is mixed with inorganic particles, leading to serous degradation at such high temperature under very high mechanical shearing conditions.

DETAILED DESCRIPTION

Embodiment 1

Figure 1A:
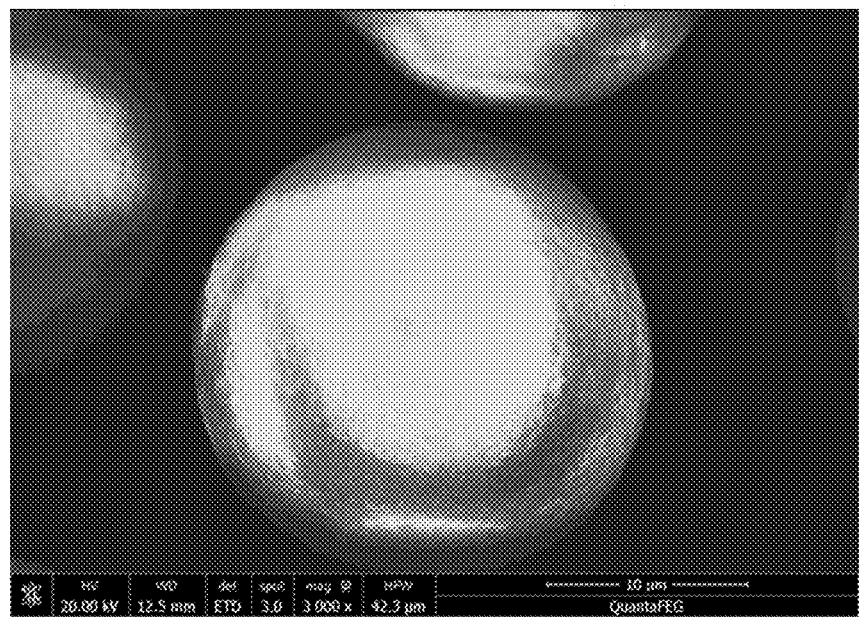
FIG. 1a is an electronic microscope photograph of an $Al_2O_3$ particle as a polymer carrier.
Figure 1B:
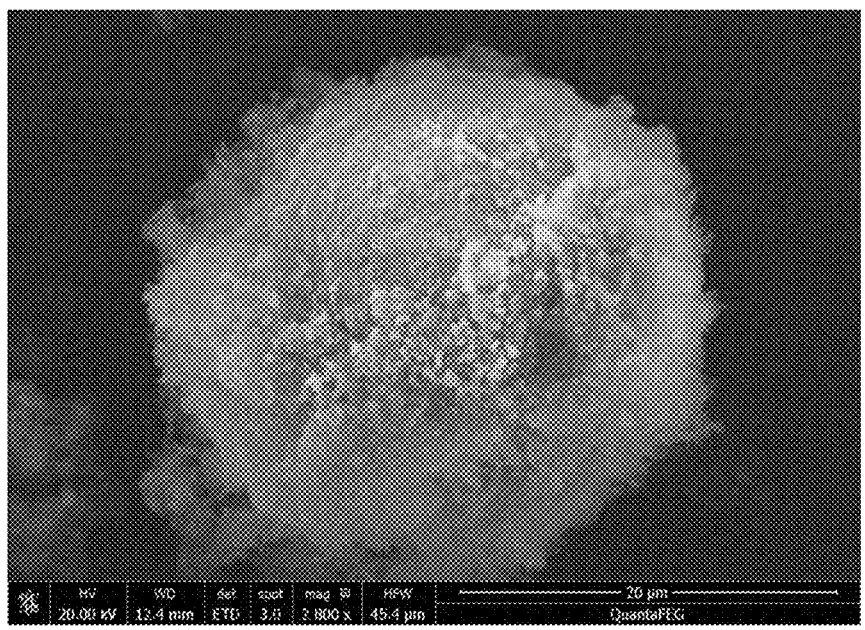
FIG. 1b is an electronic microscope photograph of the $Al_2O_3$ particle where PEKK has formed onto each of $Al_2O_3$ particles.

Firstly add 5 gram of $Al_2O_3$ of 300 nm diameter, 4 to 5 gram $AlCl_3$ and 10 ml dichloroethane into a 500 mL three-necked flask reactor equipped with a mechanical stirrer, a thermometer and a nitrogen delivery tube to introduce high-purity nitrogen in the reactor for 1 to 2 hours. It follows by cooling the reactor to a low temperature between −10° C. to −15° C. and then starting stirring, and making sure all dissolvable solids are completely dissolved at this temperature. After that, gently dropping three reaction reagents one by one in the order firstly a mixed solution of 1.25 mL of N-methyl pyrrolidone and 5 mL of dichloroethane; then dichloroethane, and the last 1.6 mL of diphenyl ether and 2.03 g of paraphthaloyl chloride (and/or terephthaloyl chloride) into the three-necked flask reactor. Keep reaction at low temperature between −5° C. and −15° C. for 1 to 2 hours, then raise the temperature of the reaction system to a temperature between 15° C. and 26° C. and keep the reaction for 10 to 15 hours. After that add 400 μL of diphenyl ether to the three-necked flask reactor to further reaction for 3 hours. Finally, add 100 mL of methanol to the three-necked flask reactor to precipitate a white solid; and wash the white solid by using distilled water, methanol and distilled water in turn, and drying the final product at 80° C. to 120° C. for 10 to 20 hours. The end product is the composite of PEKK that has been naturally coated onto each inorganic particles during polynmerization.

Embodiment 2

Firstly add 5 gram of $Al_2O_3$ of 20 μm diameter, 4 to 5 gram $AlCl_3$ and 10 ml dichloroethane into a 500 mL three-necked flask reactor equipped with a mechanical stirrer, a thermometer and a nitrogen delivery tube to introduce high-purity nitrogen in the reactor for 1 to 2 hours. It follows by cooling the reactor to a low temperature between −10° C. to −15° C. and then starting stirring, and making sure all dissolvable solids are completely dissolved at this temperature. After that, gently dropping three reaction reagents one by one in the order firstly a mixed solution of 1.25 mL of N-methyl pyrrolidone and 5 mL of dichloroethane; then the 1.6 mL of diphenyl ether and 2.03 g of paraphthaloyl chloride (and/or terephthaloyl chloride) into the three-necked flask reactor. Keep reaction at low temperature between −5° C. and −15° C. for 1 to 2 hours, then raise the temperature of the reaction system to a temperature between 15° C. and 26° C. and keep the reaction for 10 to 15 hours. After that, add 400 μL, of diphenyl ether to the three-necked flask reactor to further reaction for 3 hours. Finally, add 100 mL of methanol to the three-necked flask reactor to precipitate a white solid; and wash the white solid by using distilled water, methanol and distilled water in turn, and drying the final product at 80° C. to 120° C. for 10 to 20 hours. The end product is the composite of PEKK that has been naturally coated onto each inorganic particles during polynmerization.

Embodiment 3

Firstly add 7 gram of $SiO_2$ of 50 nm diameter, 4 to 5 gram $AlCl_3$ and 10 ml dichloroethane into a 500 mL three-necked flask reactor equipped with a mechanical stirrer, a thermometer and a nitrogen delivery tube to introduce high-purity nitrogen in the reactor for 1 to 2 hours. It follows by cooling the reactor to a low temperature between −10° C. to −15° C. and then starting stirring, and making sure all dissolvable solids are completely dissolved at this temperature. After that, gently dropping three reaction reagents one by one in the order firstly a mixed solution of 1.25 mL of N-methyl pyrrolidone and 5 mL of dichloroethane; then the 1.6 mL of diphenyl ether and 2.03 g of paraphthaloyl chloride (and/or terephthaloyl chloride) into the three-necked flask reactor. Keep reaction at low temperature between −5° C. and −15° C. for 1 to 2 hours, then raise the temperature of the reaction system to a temperature between 15° C. and 26° C. and keep the reaction for 10 to 15 hours. After that, add 4004, of diphenyl ether to the three-necked flask reactor to further reaction for 3 hours. Finally, add 100 mL of methanol to the three-necked flask reactor to precipitate a white solid; and wash the white solid by using distilled water, methanol and distilled water in turn, and drying the final product at 80° C. to 120° C. for 10 to 20 hours.

Embodiment 4

Firstly add 7 gram of $SiO_2$ of 20 μm diameter, 4 to 5 gram $AlCl_3$ and 10 ml dichloroethane into a 500 mL three-necked flask reactor equipped with a mechanical stirrer, a thermometer and a nitrogen delivery tube to introduce high-purity nitrogen in the reactor for 1 to 2 hours. It follows by cooling the reactor to a low temperature between −10° C. to −15° C. and then starting stirring, and making sure all dissolvable solids are completely dissolved at this temperature. After that, gently dropping three reaction reagents one by one in the order firstly a mixed solution of 1.25 mL of N-methyl pyrrolidone and 5 mL of dichloroethane; then the 1.6 mL of diphenyl ether and 2.03 g of paraphthaloyl chloride (and/or terephthaloyl chloride) into the three-necked flask reactor. Keep reaction at low temperature between −5° C. and −15° C. for 1 to 2 hours, then raise the temperature of the reaction system to a temperature between 15° C. and 26° C. and keep the reaction for 10 to 15 hours. After that, add 4004, of diphenyl ether to the three-necked flask reactor to further reaction for 3 hours. Finally, add 100 mL of methanol to the three-necked flask reactor to precipitate a white solid; and wash the white solid by using distilled water, methanol and distilled water in turn, and drying the final product at 80° C. to 120° C. for 10 to 20 hours.

Embodiment 5

Firstly add 7 gram of HAP of 20 nm diameter, 4 to 5 gram $AlCl_3$ and 10 ml dichloroethane into a 500 mL three-necked flask reactor equipped with a mechanical stirrer, a thermometer and a nitrogen delivery tube to introduce high-purity nitrogen in the reactor for 1 to 2 hours. It follows by cooling the reactor to a low temperature between −10° C. to −15° C. and then starting stirring, and making sure all dissolvable solids are completely dissolved at this temperature. After that, gently dropping three reaction reagents one by one in the order firstly a mixed solution of 1.25 mL of N-methyl pyrrolidone and 5mL of dichloroethane; then the 1.6 mL of diphenyl ether and 2.03 g of paraphthaloyl chloride (and/or terephthaloyl chloride) into the three-necked flask reactor. Keep reaction at low temperature between −5° C. and −15° C. for 1 to 2 hours, then raise the temperature of the reaction system to a temperature between 15° C. and 26° C. and keep the reaction for 10 to 15 hours. After that, add 400 μL of diphenyl ether to the three-necked flask reactor to further reaction for 3 hours. Finally, add 100 mL of methanol to the three-necked flask reactor to precipitate a white solid; and wash the white solid by using distilled water, methanol and distilled water in turn, and drying the final product at 80° C. to 120° C. for 10 to 20 hours.

Embodiment 6

Firstly add 7 gram of HAP of 20 μm diameter, 4 to 5 gram $AlCl_3$ and 10 ml dichloroethane into a 500 mL three-necked flask reactor equipped with a mechanical stirrer, a thermometer and a nitrogen delivery tube to introduce high-purity nitrogen in the reactor for 1 to 2 hours. It follows by cooling the reactor to a low temperature between −10° C. to −15° C. and then starting stirring, and making sure all dissolvable solids are completely dissolved at this temperature. After that, gently dropping three reaction reagents one by one in the order firstly a mixed solution of 1.25 mL of N-methyl pyrrolidone and 5 mL of dichloroethane; then the 1.6 mL of diphenyl ether and 2.03 g of paraphthaloyl chloride (and/or terephthaloyl chloride) into the three-necked flask reactor. Keep reaction at low temperature between −5° C. and −15° C. for 1 to 2 hours, then raise the temperature of the reaction system to a temperature between 15° C. and 26° C. and keep the reaction for 10 to 15 hours. After that, add 400 μL of diphenyl ether to the three-necked flask reactor to further reaction for 3 hours. Finally, add 100 mL of methanol to the three-necked flask reactor to precipitate a white solid; and wash the white solid by using distilled water, methanol and distilled water in turn, and drying the final product at 80° C. to 120° C. for 10 to 20 hours.

The invention claimed is:

1. A method, comprising:
    synthesizing polyaryletherketone molecules onto nano/micron-scale inorganic particles by mixing the nano/micron-scale inorganic particles with monomers corresponding to the polyaryletherketone, including:
        mixing the nano/micron-scale inorganic particles, $AlCl_3$, and dichloroethane in a reactor, dropping reaction reagents one by one in an order by firstly N-methyl pyrrolidone, then dichloroethane, and then diphenyl ether and one or more of paraphthaloyl chloride, terephthaloyl chloride, into the reactor, and adding diphenyl ether to the reactor for further reaction,
        wherein the monomers corresponding to the polyaryletherketone molecules onto each individual inorganic particle to wrap around each individual inorganic particle by a low temperature polymerization,
        wherein each individual inorganic particle acts as a seedbed for the low temperature polymerization, and a combination of each individual inorganic particle and the polyaryletherketone molecules wrapping around each individual inorganic particle forms a composite unit; and
    collecting all the composite units to provide nano/micron-scale inorganic polyaryletherketone composites.

2. The method according to claim 1, wherein the nano/micron-scale inorganic particles have a diameter of less than 50 μm.

3. The method according to claim 1, wherein the nano/micron-scale inorganic particles are inorganic materials including at the least ceramics, or calcium phosphates and glasses.

4. The method according to claim 1, wherein the polyaryletherketone comprises at least one of the following:

polyetherketone, polyetheretherketone, polyetherketoneketone, polyetheretherketoneketone, and polyetherketoneetherketoneketone.

5. The method according to claim 3, wherein the ceramics comprise at least one of the following compositions: $Al_2O_3$, BeO, $ZrO_2$, MgO, $TiO_2$, BC, SiC and WC.

6. The method according to claim 3, wherein the glasses comprise at least one of the following compositions: $SiO_2$, $Na_2O$, $K_2O$, CaO, MgO, BaO, PdO, ZnO, $B_2O_3$ and $P_2O_5$.

7. The method according to claim 3, wherein the calcium phosphates comprise at least one of the following compositions: $Ca(H_2PO_4)_2$, $Ca_3(PO_4)_2$, $Ca_3(PO_4)_2$, $Ca_5(PO_4)_3(OH)$, $Ca_5(PO_4)_3(OH)$, $Ca_{10}(PO_4)_6(OH, F, Cl$ or $Br)_2$, $Ca_8H_2(PO_4)_6 \cdot 5H_2O$.

8. The method according to claim 1, wherein the nano/micron-scale inorganic polyaryletherketone composites has a content of an inorganic material above 50 wt % of the total weight of the nano/micron-scale inorganic polyaryletherketone composites.

9. The method according to claim 1, wherein the low temperature polymerization is controlled at a low temperature ranging from −20° C. to 26° C.

\* \* \* \* \*